United States Patent [19]

Cardinal et al.

[11] Patent Number: 5,381,501
[45] Date of Patent: Jan. 10, 1995

[54] FIBER OPTIC BUNDLE CONNECTOR INCLUDING A HOLLOW CONE AND A TERMINAL BLOCK

[75] Inventors: James M. Cardinal, Warren; Joseph H. Gladd, Cortland; Kurt L. Jennings; Timothy N. Tackett, both of Warren, all of Ohio

[73] Assignee: General Motors Corporation, Detroit, Mich.

[21] Appl. No.: 186,940

[22] Filed: Jan. 27, 1994

[51] Int. Cl.$^6$ ............................. G02B 6/04; G02B 6/24
[52] U.S. Cl. ......................................... 385/54; 385/89; 385/136; 385/137; 385/139; 385/134
[58] Field of Search .................... 385/54, 59, 60, 65, 385/71, 76, 89, 78, 900, 901, 115, 120, 134, 136, 137, 139

[56] References Cited

U.S. PATENT DOCUMENTS

| | | | |
|---|---|---|---|
| 3,999,837 | 12/1976 | Bowen et al. | 385/54 |
| 4,047,797 | 9/1977 | Arnold et al. | 385/134 X |
| 4,441,786 | 4/1984 | Hulin et al. | 385/139 |
| 5,185,846 | 2/1993 | Basavanhally et al. | 385/137 |

*Primary Examiner*—Brian Healy
*Assistant Examiner*—Hemang Sanghavi
*Attorney, Agent, or Firm*—William A. Schuetz

[57] ABSTRACT

A fiber optic bundle connector includes a hollow cone having a neck ring and a larger inlet ring at opposite ends of a conical body, a divider disposed in the cone that divides the interior of the cone into several compartments and a terminal block having an end fitted into the inlet ring of the cone. The terminal block has a plurality of terminal cavities that extend through the terminal block to communicate with respective ones of the several compartments. A plurality of jacketed fiber optic cables each having a ferrule attached to its jacket, are inserted through the respective terminal cavities so that their jacket stripped core ends extend into the neck ring of the cone. The neck ring of the cone is deformed by a permanently deformed cinch ring to produce a tightly packed bundle of jacket stripped core ends at a connector end of the fiber optic bundle connector. The cables are terminated identically and the ferrules are then positioned in the respective terminal cavities so that each terminal cavity has substantially the same path length to the neck ring irrespective of its location in the terminal block.

12 Claims, 3 Drawing Sheets

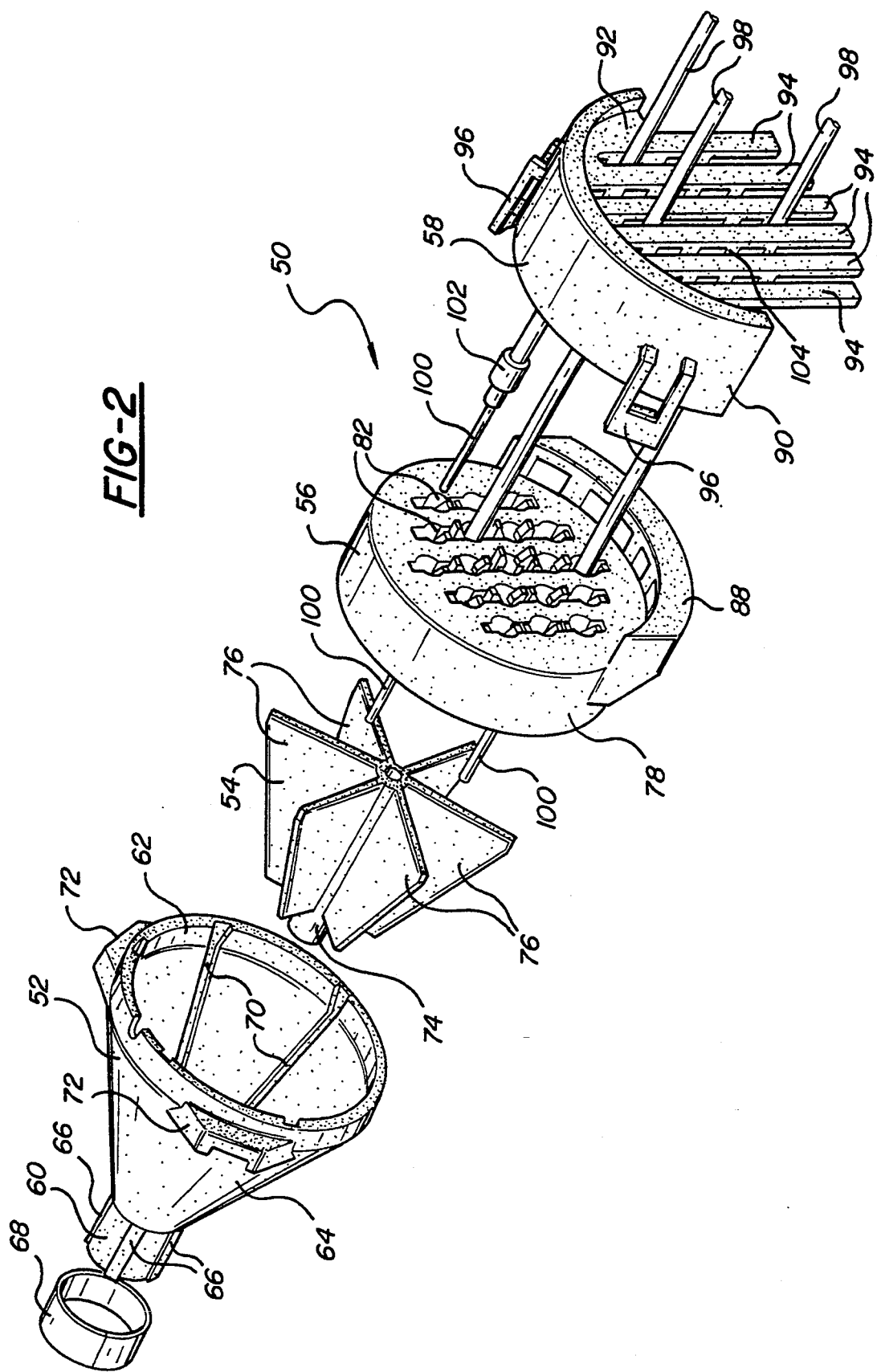

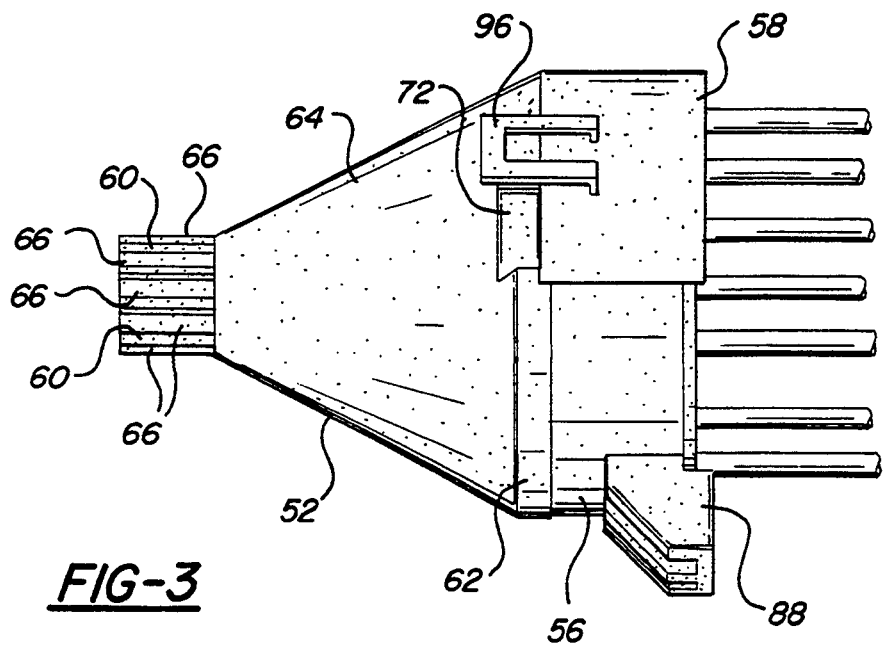
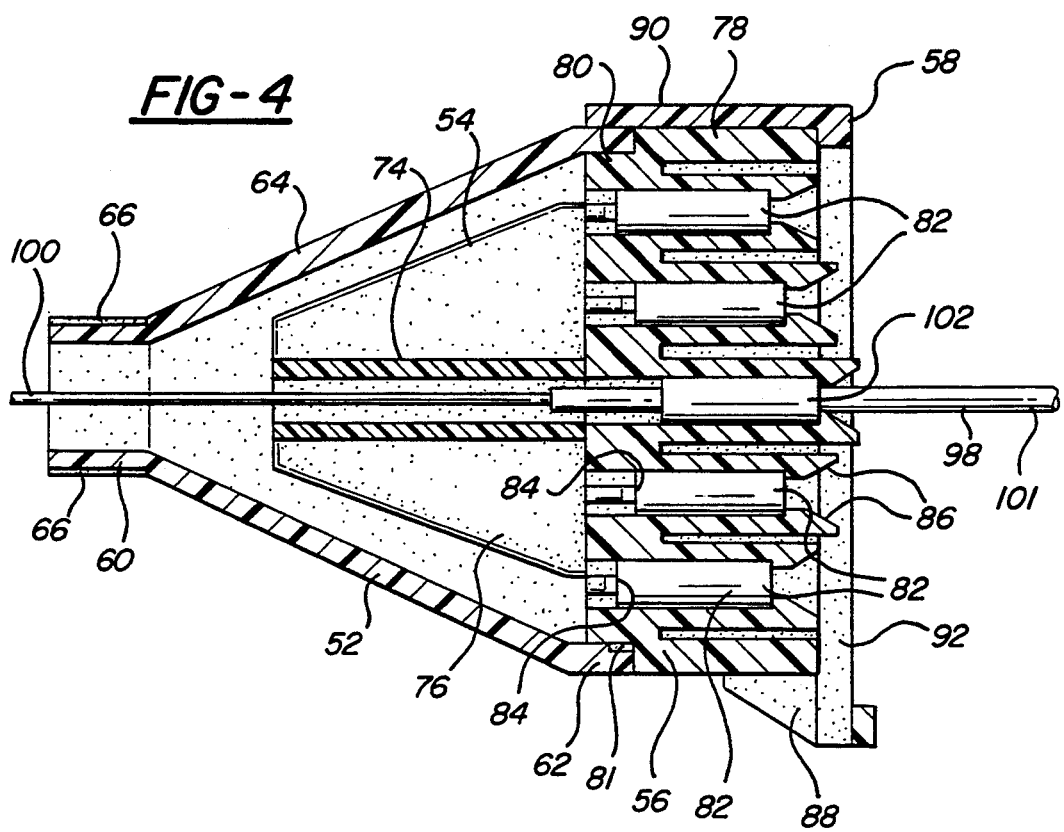

FIBER OPTIC BUNDLE CONNECTOR INCLUDING A HOLLOW CONE AND A TERMINAL BLOCK

BACKGROUND OF THE INVENTION

This invention relates generally to fiber optic distribution systems and more particularly to fiber optic bundle connectors for such systems.

A fiber optic distribution system can be used for interior lighting in automobiles. An automotive fiber optic interior lighting (FOIL) system generally comprises a light source and a fiber optic harness assembly that has a bundle of jacketed fiber optic cables for conveying light from the light source to courtesy lights, indicator lights and other lit devices at various locations in the automobile. Practical considerations require that the fiber optic harness assembly is made up of a number of fiber optic sub-harnesses that are connected together. This usually takes the form of a main fiber optic harness that is split into two branches that run down opposite sides of the automobile. These branches of the main fiber optic harness are then connected by fiber optic inline connectors to several fiber optic sub-harnesses that may be installed in doors, headliners, instrument panels or other parts of the automobile. In some instances a fiber optic sub-harness may be connected to another fiber-optic sub-harness. The fiber optic sub-harness may have one or several fiber optic cables that need to be connected to one or several fiber optic cables of the main fiber optic harness or another fiber optic sub-harness.

Thus there is a need for a fiber optic bundle connector for connecting the bundle of fiber optic cables of the main fiber optic harness to the light source.

SUMMARY OF THE INVENTION

The object of this invention then is to provide a fiber optic bundle connector for connecting a bundle of relatively unrestricted jacketed fiber optic cables to a light source or other optic device.

A feature of the invention is that the fiber optic bundle connector gathers a bundle of relatively unrestricted jacketed fiber optic cables so as to provide a very dense population of jacket stripped core ends in close proximity to each other for the efficient transfer of light from the light source to the fiber optic cables.

Another feature of the invention is that the fiber optic bundle connector includes a cone for converging a bundle of relatively unrestricted jacketed fiber optic cables into a dense population of jacket stripped core ends in close proximity to each other for the efficient transfer of light from a light source to the fiber optic cables.

Still another feature of the invention is that the fiber optic bundle connector has a cone that is equipped with a divider that divides the bundle into small numbers of cables so that the cables do not tangle when they are converged by the cone.

Still yet another feature of the invention is that the fiber optic bundle connector has a cinch ring that is permanently deformed to produce a very dense population of jacket stripped cores in proximity to each other at a neck ring end of a cone.

Still yet another feature of the invention is that fiber optic bundle connector has a cone that has a neck ring at one end that is provided with ribs that facilitate deformation of the neck ring by a permanently deformed the cinch ring to produce a very dense population of jacket stripped core ends in proximity to each other.

Still yet another feature of the invention is that fiber optic bundle connector has a terminal block that is at a large end of a cone and configured to provide several terminal cavities with substantially equal path lengths to a neck ring at the opposite end of the cone so that all of the fiber optic cables can be terminated identically thereby simplifying termination and assembly procedures.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 2 is an exploded perspective view of a fiber optic bundle connector for use in the fiber optic distributed lighting system illustrated in FIG. 1;

FIG. 3 is side view of the fiber optic bundle connector shown in FIG. 2;

FIG. 4 is a side sectional view of the fiber optic bundle connector shown in FIGS. 2 and 3.

DESCRIPTION OF THE INVENTION

Figure 1:
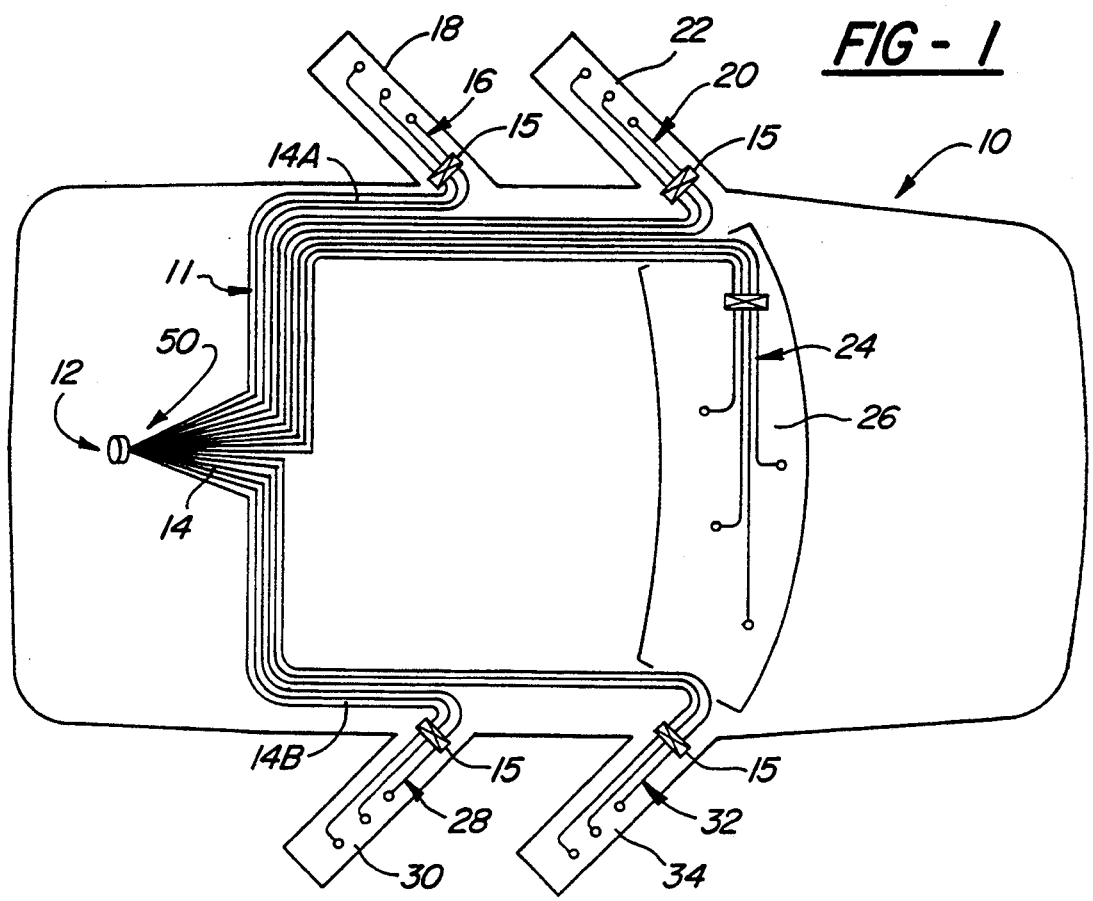
FIG. 1 is a schematic plan view of an automobile having a fiber optic distributed lighting system.

Referring now to the drawing, FIG. 1 is a schematic plan view of an automobile 10 having a fiber optic distributed lighting system comprising a light source 12, and a fiber optic harness assembly 11 that has a bundle of jacketed fiber optic cables for conveying light from light source 12 to courtesy lights, indicator lights and other lit devices at various locations in the automobile 10.

The fiber optic harness assembly 11 illustrated in FIG. 1 comprises a main fiber optic harness 14 that is split into branches 14A and 14B that run down opposite sides of the automobile. Branch 14A located on the driver's side of the automobile connects to three fiber optic sub-harnesses by means of fiber optic connectors 15. These are the fiber optic sub-harness 16 installed in a rear door 18; the fiber optic sub-harness 20 installed in a front door 22 and the fiber optic sub-harness 24 installed in instrument panel 26. Branch 14B located on the passenger side of the automobile 10 connects to two fiber optic sub-harnesses—the fiber optic sub-harness 28 installed in rear door 30 and the fiber optic sub-harness 32 installed in front door 34.

This invention is concerned with a fiber optic bundle connector 50 illustrated schematically in FIG. 1 for connecting the main fiber optic harness 14 to light source 12.

Referring now to FIGS. 2, 3 and 4, the fiber optic bundle connector 50 comprises a hollow cone 52, a spacer or divider 54, a terminal block 56 and a TPA or terminal position assurance device 58, all of which are made of moldable plastic, that is suitable for automotive use and that is compatible with the jacketed optic fibers, such as nylon 6/6.

The hollow cone 52 has a small round neck ring 60 and a larger round inlet ring 62 at opposite ends of a conical body 64. The neck ring 60 has a plurality of axially oriented, external ribs 66 that cooperate with a permanently deformable metal cinch ring 68 as explained in more detail below.

The interior of the conical body 64 and the larger inlet ring 62 have a plurality of axially oriented, circumferentially spaced grooves 70 for locating and holding the divider 54 inside the hollow cone 52. These grooves 70 extend from the opening of the inlet ring 62 far into the conical body 64 to a location near the neck ring 60.

The cone 52 has two, radially oriented, external lock nibs 72 integrally attached to the inlet ring 62 and adjacent portions of the conical body 64.

The divider 54 comprises a central pipe 74 having a plurality of integrally attached, radially oriented fins 76 that are trapezoidally shaped. The divider 54 fits into the cone 52 with the outer margins of the fins 76 disposed in respective grooves 70 of the cone 52 to position and secure the divider 54 in the cone 52. The divider 54 thus divides the interior of the cone 52 into several pie shaped compartments. In this particular example, six (6) fins divide the interior of the cone 52 into six (6) compartments. However, a larger or smaller number may be used depending on the number of fiber optic cables in the bundle of fiber optic cables of the main fiber optic harness 14 that is to be connected to light source 12. This particular example is a nineteen (19) way connector and we have found that six (6) compartments work nicely with each compartment accommodating three (3) fiber optic cables and the central pipe 74 accommodating the nineteenth cable.

The terminal block 56 comprises a round body 78 that has a reduced pilot 80 at one end that fits into the large inlet ring of the cone 52 as shown in FIG. 4. The pilot 80 has a nib 81 that fits into a small slot in the inner surface of the ring 62 for orientation. The terminal block 56 has a plurality of round terminal cavities 82 that extend through the block. In this particular instance, the nineteen (19) way connector has nineteen (19) cavities arranged in five rows. Five (5) terminal cavities are located in the middle row, four (4) terminal cavities in each of the intermediate rows and three (3) terminal cavities in each of the outer rows as best shown in FIG. 2.

The terminal block 56 has a pair of stop ribs 84 diametrically opposite each other at the connector or forward end of each terminal cavity and a pair of flexible lock fingers 86 diametrically opposite each other at the cable or rearward end of each terminal cavity. The lock fingers 86 are orthogonally related to the stop ribs 84 to facilitate molding the connector block 56 in accordance with usual practice.

The stop ribs 84 and the lock fingers 86 are of different lengths to compensate for the varying path lengths from the terminal cavities 82 to the neck ring 60. For example, the center terminal cavity which aligns with the central pipe 74 of the divider 54 is concentrically aligned with the neck ring 60. Consequently it has the shortest path length to the neck ring 60. Thus the stop ribs 84 and the lock fingers 86 associated with this center terminal cavity are the longest as shown in FIG. 4. On the other hand the terminal cavities in the two outermost rows have the longest path lengths to the neck ring 60 which is evident from FIG. 2. Thus the stop ribs 84 and the lock fingers 86 associated with these terminal cavities are shorter to compensate for the longer path length. The stop ribs 84 and the lock fingers 86 associated with the terminal cavities in the intermediate rows have intermediate lengths for the intermediate path lengths as shown in FIG. 4.

The terminal cavities 82 are arranged in rows rather that concentric circles. Consequently the lengths of the stop ribs and the fingers in each row also have to be adjusted for the different radial positions of the terminal cavities in a given row. In any event, the lengths of the stop ribs 84 are adjusted so that stop shoulders at the ends of each pair of stop ribs 84 are spaced nearly the same distance away from the small neck ring 60 irrespective of the location of the associated terminal cavity 82. The respective lengths of the lock fingers 86 are adjusted in the same way so that the hooks of each pair of lock fingers are spaced nearly the same distance away from the small neck ring 60 irrespective of the location of the associated terminal cavity 82. This equalizes the path lengths of the various terminal cavities 82 to the small neck ring 60.

This path length equalization feature has the advantage of allowing identical terminations for each of the several fiber optic cables in the bundle of the main harness assembly 14. This simplifies the termination procedures as well as the assembly of the several fiber optic cables into the fiber optic bundle connector 50 because the necessity of providing an assortment of terminated cables and selecting amongst the terminated cable assortment for each terminal cavity is avoided.

The terminal block 56 further includes a retainer boss 88 at the cable end of the terminal block 56 that is oriented transverse to the rows of terminal cavities 82 as shown in FIG. 2. The retainer boss 88 cooperates with the TPA or terminal position assurance device 58 to assure that the terminated fiber optic cables are properly positioned and retained in the terminal cavities 82 of the fiber optic bundle connector 50.

The TPA 58 comprises a part-circular shell 90 that is integrally attached to an edge of a generally rectangular wall 92. The wall 92 has a plurality of slots corresponding to the number of rows of terminal cavities 82 that divide the wall 92 into several fingers 94. The shell 90 fits on the peripheral wall of the terminal block 56 opposite the retainer boss 88 with the free ends of the fingers 94 are disposed in slots of the retainer boss 88 to hold the fingers 94 against the rearward or cable end face of the terminal block 56 as shown in FIG. 4. The fingers 94 assure that terminated fiber optic cables are properly positioned and retained in the terminal cavities 92 as explained below.

The shell 90 also has two lock arms 96 that cooperate with the lock nibs 72 of the cone 62 to hold the connector parts together.

The fiber optic bundle connector 50 further comprises a plurality of jacketed fiber optic cables 98 that comprise light transmitting cores 100 of plastic, fiber glass or other suitable light transmitting material in an outer sheath or jacket 101 of light reflective or opaque material. The cables 98 are terminated by stripping jacket 101 away to expose a predetermined length of core 100 at the end of each cable 98 as shown in FIGS. 2 and 4. The bare core end of each fiber optic cable 98 is threaded through a cylindrical ferrule 102 of metal or plastic that is then crimped onto the jacket 101 near the bare core end. The bare core end is then end finished in any suitable manner. However, a hot plate termination technique is preferred.

Because of the distance equalization feature described above, the jacketed fiber optic cables 98 are terminated identically, that is the same length of jacket 101 is removed from the ends of the several cables 98 of the harness assembly 14 and identical cylindrical ferrules 102 crimped onto the jackets at the same location on each cable. Moreover each of the jacketed fiber optic cables 98 can be completely terminated in a single operation in which the bare core end is finished.

The fiber optic bundle connector 50 is assembled as follows. The divider 54 is inserted into the cone 52 and held in place by positioning the pilot 80 of the terminal block 56 in the large round inlet ring 62 of the cone 52. The terminated fiber optic cables 98 are then inserted into the respective terminal cavities 82 of the terminal block 56 until the cylindrical ferrules 102 engage stop shoulders of the stop ribs 84 and the cylindrical ferrules 102 are retained by the hooks of the flexible fingers 86.

As the terminated fiber optic cables 98 are inserted, the bare ends of the cores 100 are guided into the central pipe 74 and the various compartments in the cone 52 by the divider 54 and thence into the small neck ring 60 at the connector end of the cone 52. The possibility of the several fiber optic cables 98 tangling as they are converged by the cone 52 is virtually eliminated by the divider 54 which as indicated above separates the bundle into small groups of three (3) optic fiber cables 98 in each compartment defined by the divider 54.

As also indicated above the stop shoulders of the stop ribs 84 and the hooks of the lock fingers 86 are located to compensate for the different path lengths of the various terminal cavities 82 to the small neck ring 60 so that the bare ends of the several cores 100 extend through the small neck ring 60 with their end faces substantially flush at the outer end of the small neck ring 60 so that no end finishing is required.

The TPA 58 is also attached to the cone 52 and held in place by the lock arms 96 engaging the lock nibs 72. This holds the entire assembly together. As indicated earlier the fingers 94 of the TPA 58 assure that the ferrules 102 of the terminated fiber optic cables 98 are all properly located in the terminal cavities 82 when it is attached. This is accomplished by the fingers 94 engaging the rearward ends of each ferrule 102 to push the ferrules 102 against their associated pairs of stop shoulders of the stop ribs 84 if the associated pairs of lock fingers 86 have not done so as shown in FIG. 4.

The two middle fingers 96 engage the rearward or cable end of the ferrule 102 in the center terminal cavity 82 directly because this ferrule is located the furthest back. However, the fingers 96 also have several nibs positioned and sized for engaging the rearward ends of the remaining ferrules 102 which as indicated above are located at different depths in the terminal cavities 82 to accommodate the various path lengths from the terminal cavities 82 to the small round neck ring 60 of the cone 52.

Figure 5:
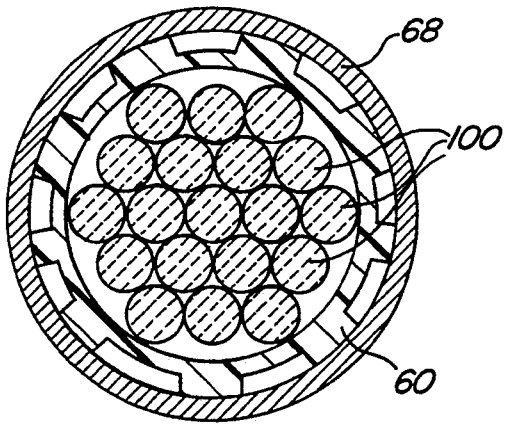
FIGS. 5 and 6 are front views of a detail of the fiber optic bundle connector that is shown in FIGS. 2, 3 and 4.
Figure 6:
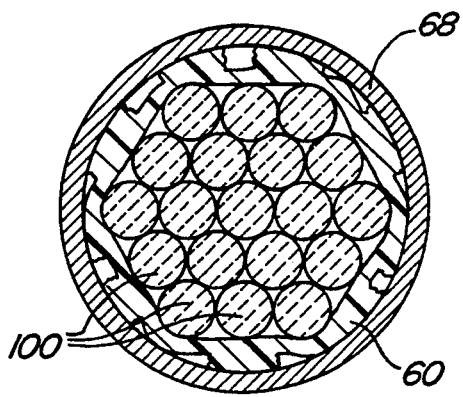

The permanently deformable metal cinch ring 68 is fitted over the ribs 66 of the small round neck ring 60 of the cone 52 after the TPA 58 is attached assuring that all the ferrules 102 of the terminated fiber optic cables 98 are properly positioned in the cavities 82 of the terminal block 56 as shown in FIG. 5. The cinch ring 68 is then permanently deformed by reducing the size of the ring 68 concentrically. This reduces the area inside the neck ring 60 to produce a tightly packed bundle of bare ends of the cores 100 at the connector end of the fiber optic bundle connector 50 as shown in FIG. 6. The cables 98 do not shift in the bundle connector 50 after the cinch ring 86 is reduced because the cables 98 are also tightly gripped at the cable end by the ferrules 102 that are retained in the terminal cavities 82.

During the reduction process described above, the ribs 66 cooperate with the deformable metal ring 86 to facilitate deformation of the neck ring 60 by providing space between the ribs 66 for migration of deforming portions of the neck ring 60.

While the cinch ring 68 is crimped concentrically, other crimp shapes are possible. In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A fiber optic bundle connector comprising:
    a hollow cone having a neck ring and a larger inlet ring at opposite ends of a conical body,
    a divider disposed in the cone having a plurality of radially oriented fins that engage an interior surface of the cone to divide the interior of the cone into several compartments,
    a terminal block at the inlet ring of the cone, the terminal block having a plurality of terminal cavities that extend through the terminal block to communicate with respective ones of the several compartments,
    a plurality of jacketed fiber optic cables each having a predetermined length of jacket stripped core end and a ferrule attached to its jacket, and
    the terminal block having means retaining portions of the cables in the respective terminal cavities so that the jacket stripped core ends extend into the neck ring of the cone.

2. The fiber optic bundle connector as defined in claim 1 wherein the neck ring of the cone is deformed by a permanently deformed cinch ring to produce a tightly packed bundle of jacket stripped core ends at a connector end of the fiber optic bundle connector.

3. The fiber optic connector as defined in claim 1 wherein the means retaining the portions of the cables in the respective terminal cavities are positioned so that each terminal cavity has substantially the same path length to the neck ring irrespective of its location in the terminal block.

4. The fiber optic connector as defined in claim 3 wherein each of the jacketed fiber optic cables have substantially the same predetermined length of jacket stripped core end and the ferrule is attached to each of the jacketed fiber optic cables at substantially the same location.

5. The fiber optic cable as defined in claim 3 wherein the plurality of jacketed fiber optic cables have substantially identical terminations comprising identical ferrules attached to respective jackets of the cables near jacket stripped core ends of substantially the same length.

6. A fiber optic bundle connector comprising:
    a hollow cone having a neck ring and a larger inlet ring at opposite ends of a conical body,
    a terminal block at the inlet ring of the cone, the terminal block having a plurality of terminal cavities that extend through the terminal block to communicate with the neck ring of the hollow cone, a plurality of jacketed fiber optic cables each having a predetermined length of jacket stripped core end and a ferrule attached to its jacket, the terminal block having means retaining the portions of the cables in the respective terminal cavities so that the jacket stripped core ends extend into the neck ring of the cone, and the neck ring of the cone being deformed by a permanently deformed cinch ring to produce a tightly packed bundle of jacket stripped core ends at a connector end of the fiber optic bundle connector.

7. The fiber optic connector as defined in claim 6 wherein the means retaining the portions of the cables in the respective terminal cavities are positioned so that each terminal cavity has substantially the same path length to the neck ring irrespective of its location in the terminal block.

8. The fiber optic connector as defined in claim 7 wherein each of the jacketed fiber optic cables have substantially the same predetermined length of jacket stripped core end and the ferrule is attached to each of the jacketed fiber optic cables at substantially the same location.

9. The fiber optic cable as defined in claim 7 wherein the plurality of jacketed fiber optic cables have substantially identical terminations comprising identical ferrules attached to respective jackets of the cables near jacket stripped core ends of substantially the same length.

10. A fiber optic bundle connector comprising:
a hollow cone having a neck ring and a larger inlet ring at opposite ends of a conical body, a terminal block at the inlet ring of the cone, the terminal block having a plurality of terminal cavities that extend through the terminal block to communicate with the neck ring of the hollow cone, a plurality of jacketed fiber optic cables each having a predetermined length of jacket stripped core end and a ferrule attached to its jacket, and the terminal block having means retaining the portions of the cables in the respective terminal cavities so that the jacket stripped core ends extend into the neck ring of the cone, the means retaining the portions of the cable in the respective terminal cavities being positioned so that each terminal cavity has substantially the same path length to the neck ring irrespective of its location in the terminal block.

11. The fiber optic connector as defined in claim 10 wherein the ferrules are retained in the terminal cavities and each of the jacketed fiber optic cables have substantially the same predetermined length of jacket stripped core end and the ferrule is attached to each of the jacketed fiber optic cables at substantially the same location.

12. The fiber optic cable as defined in claim 10 wherein the ferrules are retained in the terminal cavities and the plurality of jacketed fiber optic cables have substantially identical terminations comprising identical ferrules attached to respective jackets of the cables near jacket stripped core ends of substantially the same length.

* * * * *